Dec. 26, 1933.　　C. J. EACOCK ET AL　　1,940,792
PRESSURE METERING DEVICE
Filed Feb. 4, 1928　　4 Sheets-Sheet 1

INVENTORS
C. J. Eacock
C. H. Clauser
BY
Patrick D. Beavers
ATTORNEY.

Dec. 26, 1933.  C. J. EACOCK ET AL  1,940,792
PRESSURE METERING DEVICE
Filed Feb. 4, 1928  4 Sheets-Sheet 3

INVENTORS
C. J. Eacock
C. H. Clauser
BY
Patrick D. Beaver
ATTORNEY.

Dec. 26, 1933.  C. J. EACOCK ET AL  1,940,792
PRESSURE METERING DEVICE
Filed Feb. 4, 1928  4 Sheets-Sheet 4

Charles J. Eacock & Claude H. Clauser
INVENTORS

BY Patrick D. Beavers
ATTORNEY.

Patented Dec. 26, 1933

1,940,792

UNITED STATES PATENT OFFICE 1,940,792

PRESSURE METERING DEVICE

Charles J. Eacock, Topeka, Kans., and Claude H. Clauser, Kansas City, Mo.; Celeste H. Clauser administratrix of said Claude H. Clauser, deceased Application February 4, 1928. Serial No. 251,881

44 Claims. (Cl. 184—27)

Our invention relates to improvements in fluid feeding devices, the same pertaining more particularly to means for feeding fluid under pressure automatically in measured quantities according to the movements of the operating parts of the machine with which this device is associated.

Our invention is illustrated as being applied to lubricating devices and while, heretofore, various types of lubricating devices have been devised with a view toward economizing on the unnecessary amount of lubricant dispensed per bearing, these devices have only met with mediocre success, as their operation has been either too complex for general use, or else, the cost of manufacture has been too great in comparison with the public demand.

The purpose of this invention is to overcome these objections, by providing a device of comparatively simple construction, yet staunch and durable in use, and which in operation will be automatic, metering out the lubricant or other fluid in the proper proportion.

The lubricating, or other fluid feed device, is adapted to be actuated by the moving parts of the machinery with which it is associated.

Another object resides in providing a reservoir or other container adapted to contain a lubricant or other fluid, and with which means is associated for metering out the lubricant or other fluid in accordance with the vibrations or relative movements of a pair of mechanical members with which one of our novel metering fluid feed devices is associated.

Still another object of this invention resides in providing novel means for effecting the reciprocable feeding member of our feeding means with a reciprocatory movement, initiated by the moving part or parts of the machine with which the same is associated, said movement being proportionate to the movement of the parts with which the device is associated.

A further object resides in providing a device of this character which will be simple, but positive in operation, even with a small movement of the parts, and which will be of low cost to manufacture. The positive operation of said devices is obtained due to the provision of a vernier ratchet mechanism responsive to extremely small movements of the parts with which the same is associated. The low cost of manufacture results from the simplification of the parts of said device and due to the use of metal stampings for the majority of the parts thereof.

It is another purpose of our invention to provide means for feeding a fluid at a very high pressure, this being accomplished by providing spring means for operating the feeding member by snap action and making the feeding portion of the feeding member of relatively small cross section, whereby a relatively strong spring of relatively large size is adapted to apply a relatively high pressure per square inch effective at the face of the feeding member operating on the fluid.

It is also a purpose of our invention to provide a device of the above mentioned character that will operate in other positions than an upright vertical position, and even in a substantially horizontal position, and to provide a device of this character in which all the moving parts are immersed in the fluid which may be utilized to lubricate the same.

It is also a purpose of our invention to provide means to prevent one of the cooperating ratchet members from rotating in a reverse direction. The ratchet member held from such reverse rotation, is the one operatively connected with the means for moving the feeding member.

Other objects and advantages of our invention will apear as the description of the drawings proceeds. We desire to have it understood, however, that we do not intend to limit ourselves to the details of structure shown or described but that we intend to include as part of our invention all such obvious changes and modifications as would occur to a person skilled in this art and as would fall within the scope of the claims.

Now for a more detailed description of the invention, reference is made to the drawings wherein like numerals designate like parts of the construction. In Figs. 1 to 5 inclusive, showing one form of this invention, numeral 1 designates generally a fitting formed with an enlarged intermediate portion 2, the same being of polygonal shape to afford wrench receiving means. The lower end of the fitting is reduced and threaded to provide a nipple 3, which nipple is preferably longitudinally tapered to provide a pipe thread whereby the same may be wedged, when threaded into the body of the bearing to be lubricated. The nipple is formed with a bore 4 extending inwardly from the end thereof, and terminating within the enlargement 2. The upper portion of the fitting is also reduced and of tubular shape to provide a cylinder 5 having a longitudinal bore 6. At the lower end of the cylinder, a transversely extending bore 7 opens at diametrically opposite points on the cylinder and communicates with the longitudinal bore 6. The upper end of the cylinder is formed with a pair of cam surfaces 16—16. A bore 8 of reduced diameter connects the bore 4 in the nipple with the transverse bore 7 of the cylinder. An elongated coiled spring 9, is secured at its lower end to the nipple, while its upper end is adapted to bear against a ball 10, for normally maintaining the same in position for closing the reduced bore 8 to the bore 4.

Figure 1:
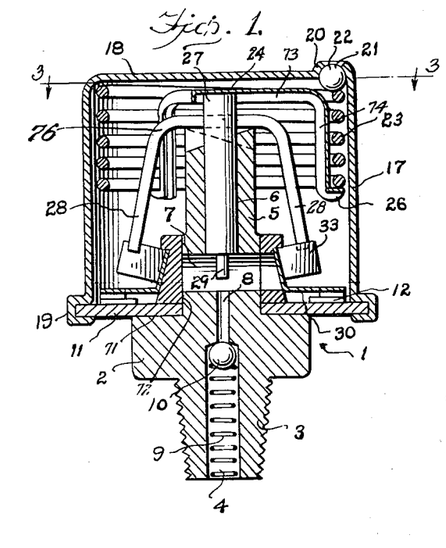
Fig. 1 is a vertical detail sectional view through the improved pressure metering device.
Figure 2:
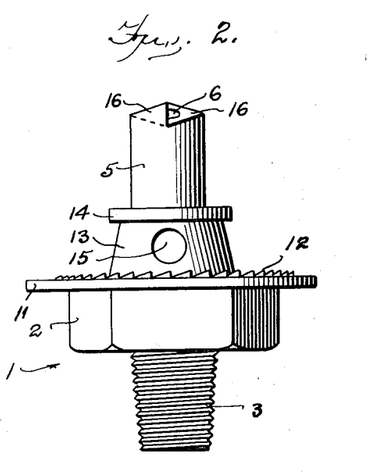
Fig. 2 represents a side elevation of the fitting and plunger cylinder constructions.
Figures 3, 4, 5:
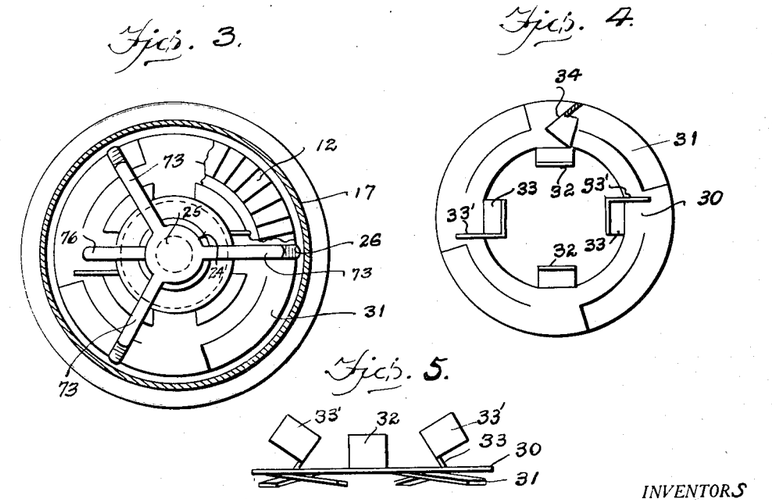
Fig. 3 is a horizontal sectional view partly broken away taken substantially on line 3—3, of Fig. 1, looking in the direction of the arrow.
Fig. 4 is a top plan view of the annular member employed for transmitting motion to the plunger.
Fig. 5 is a side elevation of said annular member.

A disc 11, of substantially greater diameter than the enlargement 2, is adapted to rest upon the shoulder 71 with the cylinder 5 projecting upwardly through an opening in the center thereof, the disc being mounted thusly, so that the same may be freely rotatable, about the slightly enlarged portion 72 of the cylinder 5. Inwardly from the periphery of the disc an annular series of rachet teeth 12 is concentrically formed thereon by a punching operation or in any other suitable manner. A circular collar 13 is preferably formed with its outside wall tapering in shape, while its upper reduced end is formed with a laterally projecting flange 14. This collar is adapted to be mounted on the enlarged portion 72 of the cylinder 5 so as to bear lightly against the disc 11. Suitable means may be employed for maintaining the collar fixed to the cylinder, and in proper relation to the disc, so that the latter will be freely rotatable on the cylinder, and upon the shoulder 2. An opening 15 is formed in the side wall of the collar in registration with the transverse bore 7 of the cylinder.

A cylindrically shaped shell 17, is closed at its upper end 18, while the edge of its free end is spun, clinched or otherwise secured tightly to the edge portion of the disc 11, in a manner clearly shown in Fig. 1, whereby the disc is rotatable with the shell. At the top of the shell, and adjacent the edge thereof, a bulge 20 is formed with an opening 21. The interior of this bulge is shaped to receive a ball 22, which ball is normally retained in position by the distortion of the last coil of the coiled spring 23, shown clearly in Fig. 1, with its upper end convolution in engagement therewith. A spider 24 is provided with a plurality of radiating arms 73, which arms project laterally and from thence downwardly in substantial parallelism at 74. These arms are constructed for strength by being formed substantially U-shaped in cross-section. These arms extend from a circular head 25 of a substantial cup-shape, the same being inverted for engagement with the plunger, to be described later. The spring 23 is disposed around the arms of the spider, so that the lower convolution thereof will engage the outwardly bent ends 26 of the arms, with the spring under compression, for normally effecting a pressure of the inverted cup 25, against the upper end of the plunger 27.

The plunger is adapted for snug slidable relation within the bore 6 of the cylinder 5. Adjacent the upper end of the plunger, a U-shaped member 76 is secured in a transverse opening therein, intermediate its bight. The leg portions 28 of this member depend at opposite sides of the cylinder, and in slightly diverged relation to each other. The bight portion of the member 76, at each side of the plunger, is adapted to bear against the cam surfaces at the upper end of the cylinder, and to move thereon, when rotary motion is imparted thereto. When the bight portion of the U-shaped member is at the opposed peaks of the cam surfaces, the lower face of the reduced end portion 29 is completely withdrawn from the bore 8 with enough clearance that fluid may readily flow into bore 8.

An annular member 30 is constructed preferably of sheet metal and formed with spring fingers 31 struck downwardly therefrom at the outer edge thereof. Upstanding fingers 32 and 33 are formed at the inner edge of the ring 30 and at diametrically opposed points thereon. When the ring is properly disposed around the collar 13, the fingers 32 and 33 will snugly engage opposed sides of the collar, to provide a frictional grip of said fingers on said collar 13, while their upper ends will limit the upward movement of the ring, due to the engagement thereof with the lateral flange 14. The fingers 33 are each formed with an outwardly disposed fin 33', said fins being adapted to engage the lower ends of the arms 28. The spring fingers 31 are so arranged, that only one of the same engages the ratchet teeth 12 on the disc at a time forming a vernier ratchet mechanism in cooperation with said teeth. Said annular member 30 is provided with a cup or bucket 34, whereby the device may be employed in a horizontal position, as shown in Figures 6 and 7 allowing the lubricant or other fluid to be elevated to a position over the opening 15 of the bore, from where the lubricant or other fluid will flow into the transverse bore of the cylinder.

Figure 6:
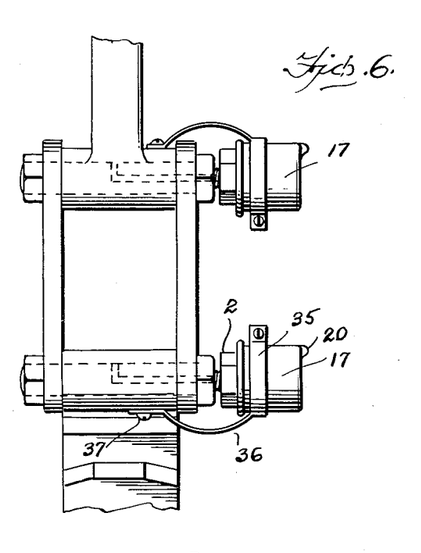
Fig. 6 is a side elevation of a pair of our devices employed as horizontally disposed lubricators for the shackle bolts of a conventional vehicle spring.
Figure 7:
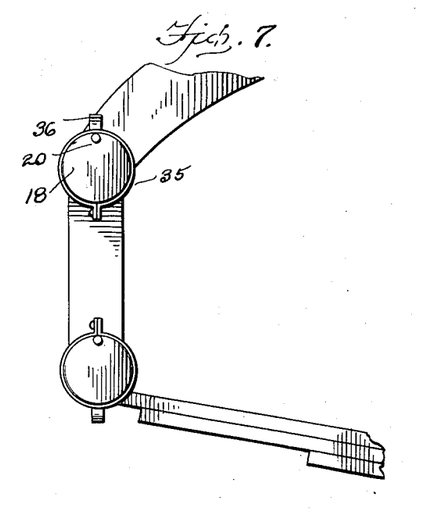
Fig. 7 is an end elevation of the lubricators shown in Fig. 6.
Figure 8:
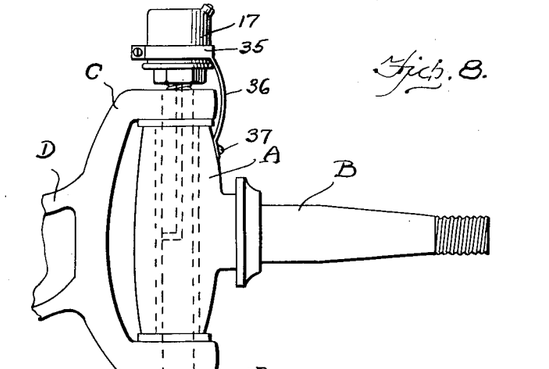
Fig. 8 is a side elevation of one of our devices mounted in vertical position on the knuckle bearing of a stub axle.

In the operation of the device, a band 35 is clamped around the shell 17, in a manner clearly shown in Figures 6, 7, and 8 of the drawings. This band is provided with a leg 36 which is secured to the adjacent moving part of the machine by suitable fastening means 37. Assuming, for illustration, that the leg is secured to the knuckle A, of a stub axle B, which is pivotally disposed between the yoke C, of a conventional front axle D, shown clearly in Fig. 8, when the stub axle is oscillated by the movement of the connecting rod of the steering mechanism, not shown, the shell will be caused to move on the fitting. In this movement, even if very minute, the shell and disc will consequently move, imparting motion from the ratchet teeth 12 to the ring 30, through the fingers 31. The ring 30 is held against movement in the opposite direction with the member 11 by the frictional engagement between the members 32 and 33 and the member 13. The movement of the ring will result in the movement of the U-shaped member 76, due to the contact of the lower ends of the arms 28 with the fins 33'. This results in the riding of the bight of the U-shaped member on the double cam surface of the cylinder against the compression of the spring 23. When the opposed portions of the bight have simultaneously reached the peaks of the cam surfaces, and have passed thereover, the plunger 27 will be released, and due to the compression of the spring the reduced portion 29 of the same constituting a reciprocable feeding member will snap into the reduced bore 8. This action will result in the reduced portion 29 entering the bore 8 by snap action forcing some of the fluid contained in the bore 8 into the bore 4. The amount of entry and size of bore 8 will determine the metering action per stroke.

Figure 9:
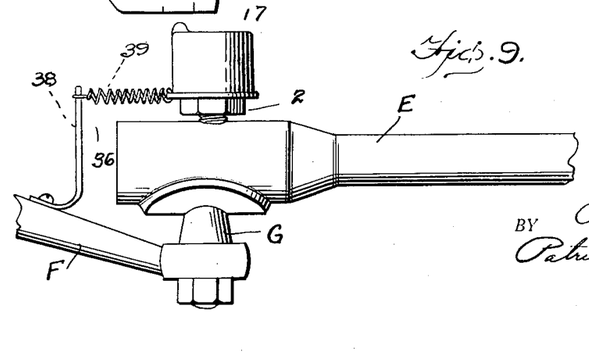
Fig. 9 is a side elevation of one of our devices shown in vertical position associated with the joint of a steering gear connecting rod.

As is shown in Fig. 9, a connecting rod E, of an ordinary steering mechanism has a lever F pivotally connecting the same to the usual knuckle of a stub axle, shown in Fig. 8. These connecting rods are usually enlarged at their ends, while a spindle G carried by the lever pivotally connects the lever therewith. An arm 38, shown in Fig. 9, is connected to the shell of the lubricator by a coiled spring 39, whereby the shell will always be under the tension of the spring, and will be moved upon movement of the arm 38. This motion imparting means is employed in place of the clamped band and leg arrangement, where the band would be put under a twisting strain as in Fig. 9.

Figure 10:
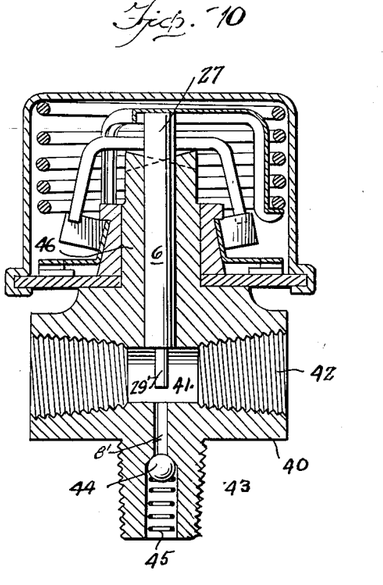
Fig. 10 is a vertical sectional view through a slightly modified form of the invention adapted to be operated from a central reservoir.

In Fig. 10, of the drawings, a modified form of the invention is shown, wherein a fitting 40 is formed with a transverse bore 41, the outer portions of which are provided with internal pipe threads 42, to receive the threaded ends of a lubricant conduit leading from a suitable central reservoir. This form of the device is very practical in use where lubricant is supplied to machinery from a central or main reservoir. This fitting is provided with a nipple 43 having a longitudinal bore extending inwardly from the end thereof, and communicating with the transverse bore 41. A ball 44 is held against a seat within the bore of the nipple by a coiled spring 45. A cylinder 46 is provided at the top of the fitting, in which the plunger of like construction to that shown in Fig. 1, is operable, the reduced end portion 29' thereof operating in the reduced bore 8'. The balance of the structure as disclosed in this figure represents working parts of the form shown in Figs. 1 to 5 inclusive.

Figure 11:
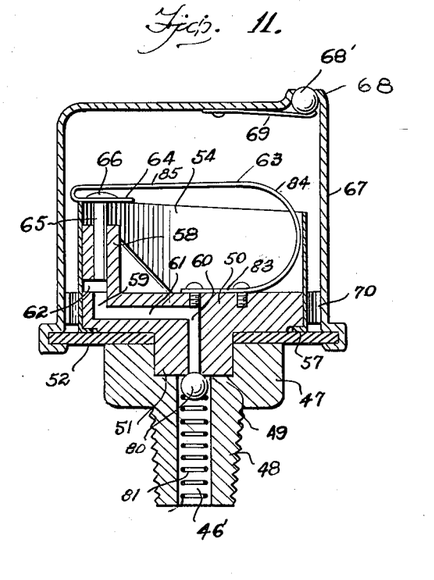
Fig. 11 is a vertical section view through still another form of our invention.

Another form of the invention is disclosed in Fig. 11, wherein a fitting 47 is formed with a reduced depending threaded nipple 48. The nipple is formed with a bore 48' extending inwardly from the end thereof, in which a ball 80 is normally urged upwardly by the spring 81. The top of the fitting is formed with a recess 49 communicating with the bore 48'. A circular body 50 is formed with a depending projection 51 adapted to have a drive fit in the recess 49 of the fitting. A disc 52 is formed with an opening at its center, through which the member depends, and which is arranged for easy or free rotable movement between the body and the fitting. A ring 54 has its upper edge inclined to provide a cam. This cam edge is inclined from a low point to a peak 55 immediately above the low point providing an abrupt shoulder 82. Adjacent the lower edge of the wall a plurality of circumferentially extending spring fingers 56 are struck outwardly from the ring. The lower edge of the ring is provided with a suitable number of inwardly bent lugs 57, whereby the ring may be supported for rotation between the disc 52 and the body 50. An upstanding portion 58 of the body 50 is formed with a vertically extending bore 59 opening at the top of the portion 58. A bore 60 extends inwardly from the end of the depending member 51, while a horizontal bore 61 connects the bore 59 with the bore 60. An opening 62 communicating with the bore 59 is provided in the member 58, to admit fluid to the bore 59.

An elongated spring arm 63, has one end 83 thereof secured to the top surface of the body 50. From the secured portion 83 a curved portion 84 of the arm extends upwardly and terminates in a transversely extending portion 85, while its opposite end portion is bent inwardly in parallelism with itself. The inwardly bent portion designated 64 is adapted to compressionally bear against the cam edge of the ring 54. A plunger 65 is formed with an enlarged head 66 adapted for disposition between the end portion 64, and the adjacent portion of the arm, while the plunger itself, depends through an opening in the bent end of the arm, for slidable relation within the vertical bore 59 of the body.

Figure 12:
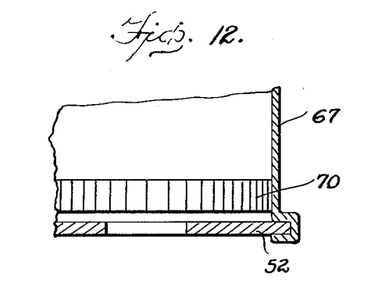
Fig. 12 is a fragmentary sectional view of the shell employed in the form disclosed in Fig. 11.
Figure 13:
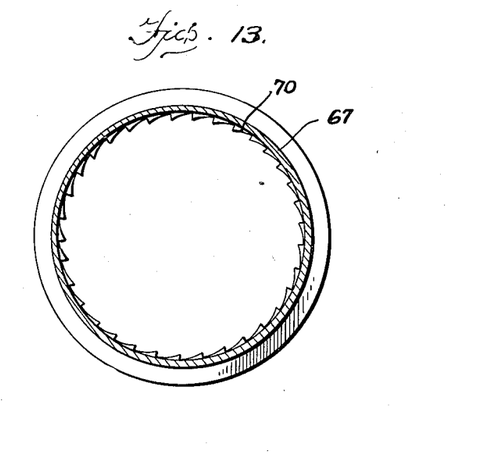
Fig. 13 is a horizontal sectional view through the shell of the latter form, and disclosing the annular ratchet on the interior side thereof.
Figure 14:
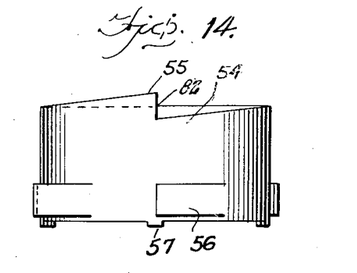
Fig. 14 is a side elevation of the cam employed in the form disclosed in Fig. 11.

A shell 67 of cylindrical shape, is closed at its top, while the bottom thereof is open, the edge of which is spun, clinched or otherwise tightly secured to the disc 52. Adjacent one edge at the top of the shell, a bulge 68 is formed, in which a ball 68' is retained in seated position by the tension of the strip spring 69. At the interior of the shell, adjacent the open bottom thereof, a circumferential ratchet formation 70 is adapted to be normally engaged by one of the spring fingers 56, at a time.

Obviously, when the shell 67 is moved by the motion imparted through the connections hereinbefore described, the engagement of the fingers 56 with the ratchet formation 70, will transmit like motion to the annular ring 54. The rotation of the ring will slowly elevate the plunger, so that when the peak of the cam edge is reached, the plunger will snap downwardly in the bore 59 causing the lubricant contained therein, to be forced past the tensioned ball 47, at high pressure and into the bearing to be lubricated.

The form of the invention shown in Figs. 15 to 21 inclusive, is the construction preferred at the present time. In these figures the device comprises a body portion 90 having a bore 91, and having an enlarged portion 92 provided with a tapered or conical sidewall portion 93. A transversely extending passage 94 is provided in the enlarged portion 92 and opens out of the side wall 93 at one end thereof. The passage 94 intersects a reduced bore 95 provided in the body portion 90 and extending through the outer end of the reduced externally threaded extension 96 on the body portion. The reduced threaded extension 96 is adapted to engage with the internal threads 97 on the connecting member 98 which has a reduced externally threaded portion 99 on one end therof. The thread on the portion 99 is preferably a pipe thread.

Figure 15:
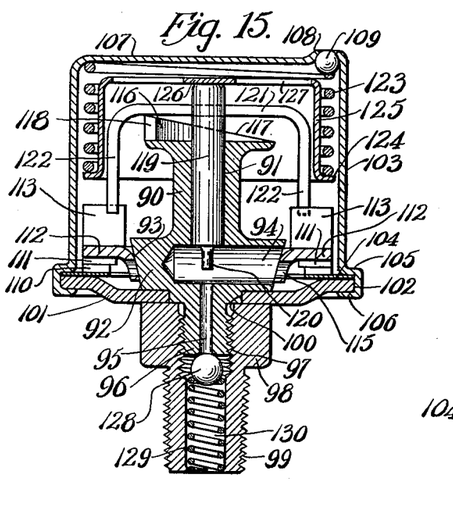
Fig. 15 is a vertical sectional view of our improved fluid feeding device showing the form thereof preferred at the present time.

When the body portion 90 and the connecting member 98 are secured together so that the end face of the cylindrical offset 100, provided between enlargement 92 and the reduced threaded extension 96, engages with the flat end face of the member 98, the member 101 is mounted between the body portion 90 and the connecting member 98 so as to be freely rotatable upon the cylindrical portion 100. The disc-like member 101 is slightly dished and is engaged in the groove 102 formed in the housing member 103.

The sheet metal disc 104 is clamped between the member 101 and the offset 105 in the wall of the housing 103 by clinching over or otherwise forming the flange 106 on the member 103 when the parts are assembled. Thus the housing 103 and the disc 104 rotate with the disc 101. Said housing is provided with an end wall 107 formed to provide a seat at 108 for the ball filling valve 109. The disc 104 is shown in detail in Figs. 17 and 18 and is provided with a plurality of up struck spring fingers 110 thereon, which extend in a circumferential direction and which act as pawl members, cooperating with the ratchet teeth provided on the ratchet member 112.

Figure 19:
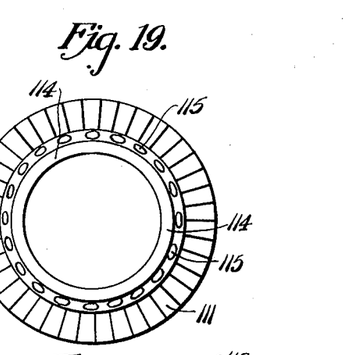
Fig. 19 is a bottom plan view of the other rachet member.
Figure 20:
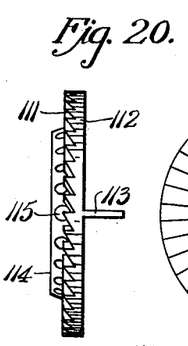
Fig. 20 is an edge view thereof.
Figure 21:
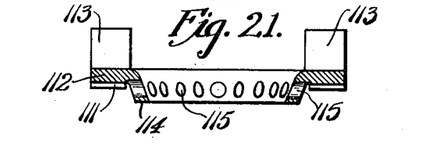
Fig. 21 is a transverse section of the rachet member shown in Fig. 19.

The ratchet member 112 is shown more in detail in Figs. 19, 20 and 21. The member 112 is preferably made of sheet metal by a stamping operation so as to form the ratchet teeth 111 thereon and to form a pair of fingers, or wings 113 thereon extending from the face thereof opposite that having the teeth thereon. The inner portion of the ratchet member 112 is provided with an inclined annular flanged portion 114, providing a conical inner wall portion engaging with the conical face 93 of the enlargement 92. The flange 114 is further provided with a circular series of openings 115 extending thru the same, so as to establish communication between the transverse passage 94 and the chamber formed within the housing 103 as the openings 115 align with the passage 94.

Figure 16:
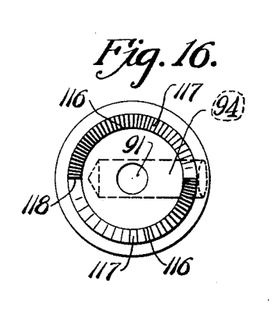
Fig. 16 is a view looking at the cam member from the top thereof.
Figure 17:
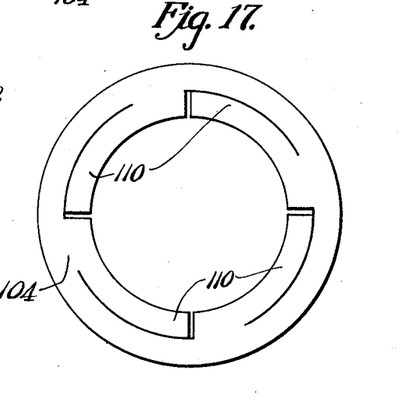
Fig. 17 is a plan view of one of the cooperating ratchet members.
Figure 18:
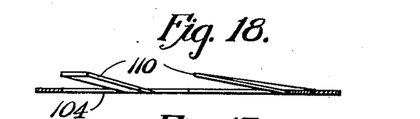
Fig. 18 is a transverse section thereof.

The body portion 90 is provided with a pair of cams 116 thereon which are arcuate in form and which have inclined faces 117, extending from the low portion of each cam to the abrupt shoulder 118, at the hight point of each cam, the abrupt shoulders 118 being diametrically opposite each other. A reciprocable feeding member, 119 having the reduced feeding portion 120 at one end thereof is provided with a transverse opening thru which the transversely extending portion 121 of a U-shaped yoke extends, the depending substantially parallel end portions 122, of said yoke engaging with the wings or fingers 113. The transversely extending portion 121 of the yoke rides on the inclined cam surface 117 being held in engagement with the cam by means of the compression spring 123 of relatively great capacity which engages the outwardly extending flange 124 of the inverted cup 125, the central or hub portion 126 of the cup bearing against the end of the feeding member 119 opposite that having the reduced portion 120 thereon, said cup having openings 127 in the end wall thereof. One end of the compression spring 123 bears against the outwardly extending flange 124 of the inverted cup 125 and the other end thereof engages with the end wall 107 of the housing. The end coil of the spring 123 adjacent the end wall 107 engages the ball 109 at one side thereof to hold the same seated due to the slight distortion of the one turn of the spring, the pressure exerted on the ball thus being only a fraction of the total pressure exerted by the spring on the cup 125.

In operation the housing 103 is rotated relative to the connecting member 98 by mounting the same in any of the ways previously described or in any other desired manner so that the housing is connected with a part that is movable relative to the connecting member. Upon slight movement of the members 98 and 103 relative to each other, whether the motion be rotative or oscillatory, one of the fingers 110 will engage with a ratchet tooth 111 on the abrupt face thereof to move the member 112 in a forward direction. By a forward direction is meant a direction of rotation which is predetermined and which is always the same in the device. The direction of rotation is such that the transverse portion 121 of the U-shaped yoke member will ride up the inclined faces 117 of the cams 116 and drop off the shoulders 118. The ratchet teeth are preferably of a number that is not a multiple of the number of fingers nor the factors of either number are multiples of either the numbers or the factors so that each finger is in contact with a different part of a ratchet tooth in any position of the ratchet. In the arrangement shown there are forty-one ratchet teeth and four fingers 110. A vernier ratchet mechanism is thus provided that will cause the member 112 to rotate in a forward direction upon a very slight movement of the members 103 and 98 relative to each other and will substantially entirely prevent an oscillation of the parts relative to each other without a movement of the member 112. As the feeding member 119 is moved in one direction in exact proportion to the movements of the member 112 and, due to the ratchet mechanism, in exact proportion to the relative movements of the members 103 and 98, the feeding means will be operated in such a manner as to be a fluid feed metering means. The movement in a feeding direction takes place by snap action due to compression of the spring 123, when the yoke drops off the shoulders 118. This causes the reduced end portion 120 of the feeding member 119 to enter the reduced bore 95 and due to the small cross section of the face thereof the pressure of the spring 123, which is of relatively large capacity is exerted on the fluid contained in the reduced bore 95 so as to produce a very high pressure per square inch on said fluid. Due to the rapid movement of the feeding portion 120 of the member 119, there is no necessity of an extremely fine fit between the bore 95 and the member 120 as the flow of fluid will instantly displace the ball valve 128 which is seated against the end of the reduced bore 95, normally, by compression of the spring 129, which is secured at its outer end, in any suitable manner, within the passage 130 provided in the reduced threaded extension 99 of the member 98. The reduced threaded end portion 99 of the member 98 serves as a nipple for connection with any suitable internally threaded member with which the device is to be engaged for feeding fluid into the same.

By providing the conical outer surface 93 on the member 90 and the conical or inclined flange 114 on the member 112 cooperating therewith a wedging action in between these parts takes place as the inclined faces of the teeth 111 ride along the fingers 110 to prevent reverse rotation of the member 112. The member 112 due to its formation acts as a pick up device for the fluid in the chamber provided within the housing 103 to carry the fluid around to such a point that the same will feed into the open end of the passage 94, the ratchet teeth acting as bucket members to supply the fluid to the openings 115 in alignment with the passage 94. This makes it possible to use the feeding device in even a horizontal position as long as the same is applied so that the opening to the passage 94 is upward while in such horiontal position.

In all the forms of the invention shown, the housing will contain some of the fluid, so that the parts of the device that are movable, all of which are in the housing, will be lubricated by the fluid. In the form shown in Fig. 10, there will be sufficient leakage of the fluid thru the bore 75 around the member 27 to supply fluid to the housing for lubricating purposes.

Having thus described our invention, what we desire to claim and secure by United States Letters Patent is:—

1. In a device of the character described, fluid feeding means comprising reciprocable means and means for reciprocating the same comprising a pair of relatively movable elements, one of said elements being provided with a clutch device and the other of said elements being provided with a cooperating clutch device to provide a rotation in unison of said elements in a direction to move said reciprocable means upon every slight movement of said elements in one direction.

2. In a device of the character described, fluid feeding means comprising reciprocable means and means for reciprocating the same comprising a pair of relatively movable elements, one of said elements being provided with ratchet teeth and the other of said elements being provided with means cooperating with said teeth to provide a rotation in unison of said elements in a direction to positively move said reciprocable means upon every relative movement of said elements in one direction through a distance less than that of one ratchet tooth.

3. In a device of the character described, fluid feeding means comprising a reciprocable member and means for reciprocating the same comprising a pair of rotatable members and means for rotating the same together in one direction comprising a vernier ratchet mechanism.

4. In a device of the character described, fluid feeding means comprising a member having a bore therein, a reciprocable member, resilient means for moving said reciprocable member in a feeding direction, and positively actuated means for moving said reciprocable member against the action of said resilient means, comprising means for positively driving the same from a point externally of said device, said reciprocable member having a portion operating in said bore whereby a relatively high pressure is imparted to said fluid by said resilient means.

5. In a device of the character described, fluid feeding means comprising a member having a bore therein, a reciprocable member having a feeding portion operating in said bore, resilient means, and means for moving said reciprocable member against the action of said resilient means, a fluid chamber communicating with said bore and means for feeding fluid from said chamber toward said bore in any position of said device between a horizontal and an upright position.

6. In a device of the character described, fluid feeding means comprising a member having a bore therein, a reciprocable feeding member operable in said bore, resilient means and means for moving said reciprocable member against the action of said resilient means, comprising rotatable actuating means, a fluid chamber communicating with said bore and means for feeding fluid from said chamber toward said bore comprising fluid carrying members associated with said rotatable actuating means.

7. In a device of the character described, fluid feeding means comprising a member having a bore therein, a reciprocable member operating therein, resilient means for moving said reciprocable member in a feeding direction, means for moving said reciprocable member against the action of said resilient means and permitting said resilient means to actuate said reciprocable member by snap action, comprising a cam mechanism and a ratchet mechanism having means associated therewith cooperating with said cam mechanism, and a fluid tight housing for said reciprocable member, resilient means, and cam and ratchet mechanism, adapted to contain a lubricant said cam mechanism being actuated by said housing through said ratchet mechanism.

8. In a device of the character described, fluid feeding means comprising a member having a bore therein, and metering feeding mechanism comprising a feeding element reciprocable in said bore, a housing portion movable relative to said member, and means for moving said feeding element in proportion to the movement of said member relative to said housing portion comprising ratchet mechanism for moving said feeding element in one direction actuated by the relative movement of said housing portion and said member in one direction and resilient means for moving said feeding element in the opposite direction.

9. In a device of the character described, fluid feeding means comprising a member having a bore therein, and metering feeding mechanism comprising a feeding element reciprocable in the member having a bore therein, a housing portion movable relative to said member, and means for moving said feeding element in proportion to the movement of said member relative to said housing portion comprising ratchet mechanism for moving said feeding element in one direction positively actuated by the relative movement of said housing portion and said member in one direction, resilient means urging said feeding member in the opposite direction and means cooperating with said resilient means to actuate said feeding element in feeding direction by snap action.

10. In a device of the character described, fluid feeding means comprising a member having a bore therein, a reciprocable feeding member operating in said bore, and means for reciprocating said member comprising a pair of cooperating ratchet members, one of said ratchet members and said member having the bore therein having engaging means for holding said ratchet member from movement in a reverse direction.

11. In a device of the character described, fluid feeding means comprising a member having a bore therein, a reciprocable feeding member operating in said bore, and means for reciprocating said member comprising a pair of cooperating ratchet members, one of said ratchet members and the member having the bore therein having engaging means for holding said ratchet member from movement in a reverse direction by wedging action.

12. In a device of the character described, fluid feeding means comprising a reciprocable feeding member, means for reciprocating said member, comprising a pair of cooperating ratchet members and means for holding one of said ratchet members from reverse rotation, comprising a member forming a portion of said feeding means extending through the said ratchet member and means on said ratchet member cooperating therewith.

13. In a device of the character described, a member having a longitudinal bore, a shell adapted to contain a fluid mounted upon said member, a plunger operable within the bore, said plunger having an end portion adapted to enter a bore of small cross section in said member, spring means for normally urging the plunger in a feeding direction, mechanism connecting the shell with the plunger for imparting rotary motion to the latter comprising a ratchet device, said member being provided with a cam surface and said mechanism comprising a member adapted to engage said cam surface to control the movement of said plunger whereby said end portion of said plunger is moved into said bore in a feeding direction by snap action by said spring means.

14. In a device of the character described, fluid feeding means comprising a feeding member, resilient means for moving said feeding member in a feeding direction and means for controlling the feeding movements of said feeding member in direct proportion to the movement of a part to which said device feeds fluid, comprising a member for moving said feeding member against the action of said resilient means and actuating means therefor, comprising a driving connection between said part and said last mentioned member.

15. In a device of the character described, fluid feeding means comprising a feeding member, resilient means for moving said feeding member in a feeding direction by snap action and means for controlling the feeding movements of said feeding member in direct proportion to the movement of a part to which said device feeds fluid, comprising a member for moving said feeding member against the action of said resilient means and actuating means therefor, comprising a driving connection between said part and said last mentioned member.

16. In a device of the character described, fluid feeding means comprising a feeding member, resilient means for moving said feeding member in a feeding direction and means for controlling the feeding movements of said feeding member in direct proportion to the movement of a part to which said device feeds fluid, comprising a member for moving said feeding member against the action of said resilient means and actuating means therefor comprising a ratchet driving connection between said part and said last mentioned member.

17. In a device of the character described, fluid feeding means comprising a feeding member, resilient means for moving said feeding member in a feeding direction by snap action and means for controlling the feeding movements of said feeding member in direct proportion to the movement of a part to which said device feeds fluid, comprising a member for moving said feeding member against the action of said resilient means and actuating means therefor comprising a vernier ratchet driving connection between said part and said last mentioned member.

18. In a device of the character described, a body portion, a housing portion movably mounted relative to said body portion, and fluid feeding means comprising a feeding member, resilient means for moving said feeding member in a feeding direction and means for controlling the feeding movements of said feeding member, comprising a member for moving said feeding member against the action of said resilient means and releasing the same after said resilient means has been placed under a predetermined tension, and driving mechanism for said last mentioned member positively actuated by relative movement of said body and housing portions in a predetermined direction.

19. In a device of the character described, a body portion, a housing portion movably mounted relative to said body portion, and fluid feeding means comprising a feeding member, resilient means for moving said feeding member in a feeding direction and means for controlling the feeding movements of said feeding member, comprising a member for moving said feeding member against the action of said resilient means and releasing the same after said resilient means has been placed under a predetermined tension, and ratchet driving mechanism for said last mentioned member positively actuated by relative movement of said body and housing portions in a predetermined direction.

20. A device of the character described comprising a pair of members having means for attachment to a pair of relatively movable parts to move therewith and fluid feeding means actuated by said members through a clutch mechanism, and fluid feed controlling mechanism actuated thereby, said clutch mechanism operating to positively drive said controlling mechanism in fixed proportion to the relative movement of said pair of members and said pair of relatively movable parts to each other in one direction.

21. A device of the character described comprising a pair of members having means for attachment to a pair of relatively movable parts to move therewith, and fluid feeding means, comprising a reciprocable member and resilient means for moving the same in a feeding direction, controlling mechanism movable in a predetermined direction to tension said resilient means and release said resilient means to project said feeding member in a feeding direction after predetermined movement of said controlling mechanism, and clutch mechanism operating to positively drive said controlling mechanism in fixed proportion to the relative movement of said pair of members and said pair of relatively movable parts to each other in one direction.

22. In a device of the character described, fluid feeding means comprising a reciprocable plunger and means for reciprocating the same, comprising a pair of relatively movable parts having engaging surfaces to which said fluid is to be fed by said device, and actuating means for said reciprocable plunger, comprising a clutch mechanism connected with one of said relatively movable parts and a movable member for controlling feeding strokes of said reciprocable plunger, having a positive mechanical connection with one of said relatively movable parts through said clutch mechanism to move said reciprocable plunger upon slight relative movement of said relatively movable parts.

23. In a device of the character described, fluid feeding means comprising a pair of relatively rotatable members, a feeding member movable in opposite directions, and means for moving the same in both directions comprising, a spring and a movable controlling member positively controlling the feeding movements of said feeding member due to the action of said spring in proportion to the movements of said controlling member and a driving connection between said controlling member and one of said relatively rotatable members providing a positive mechanical connection between said rotatable member and said controlling member to move said controlling member upon every relative rotation of said relatively rotatable members in a predetermined direction.

24. In a device of the character described, a pair of relatively movable housing and base members, a reciprocable plunger and means to produce each feeding stroke of said plunger in measured proportion to a predetermined amount of relative movement of said housing and base members in a predetermined direction, comprising means tending to move said plunger in a feeding direction, a movable controlling member directly connected with said plunger and releasing the same after said controlling member has moved through a predetermined distance to produce a feeding stroke of said plunger and means for positively driving said controlling member in direct proportion to the relative movements of said housing and base members in said direction, comprising a clutch mechanism including a member positively driven by every slight relative movement of said housing and base members in said direction and positively driving said controlling member.

25. In a device of the character described, a pair of relatively movable housing and base members, a reciprocable plunger and means to produce each feeding stroke of said plunger in measured proportion to a predetermined amount of relative movement of said housing and base members in a predetermined direction, comprising resilient means for moving said plunger in a feeding direction, a movable controlling member directly connected with said plunger, means for positively driving said controlling member in direct proportion to the relative movements of said housing and base members in said direction, comprising a clutch mechanism including a member positively driving said controlling member and positively driven by every slight relative movement of said housing and base members in said direction, and cam means cooperating with said controlling member to move the same against the action of said resilient means and release the same after said controlling member has moved through a predetermined distance to produce a feeding stroke of said plunger.

26. In a device of the character described, a pair of relatively rotatable housing and base members, a reciprocable plunger and means to produce each feeding stroke of said plunger in measured proportion to a predetermined amount of relative rotation of said housing and base members in a predetermined direction, comprising resilient means for moving said plunger in a feeding direction, a rotatable controlling member directly connected with said plunger, means for positively rotating said controlling member in direct proportion to the relative rotation of said housing and base members in said direction, comprising a clutch mechanism including a member positively driving said controlling member and positively driven by every slight relative rotation of said housing and base members in said direction, and cam means cooperating with said controlling member to move the same against the action of said resilient means during rotation thereof, and release the same after said controlling member has been rotated through a predetermined distance to produce a feeding stroke of said plunger.

27. In a device of the character described, relatively movable housing and base members, a reciprocable plunger and means to produce a feeding stroke of said plunger comprising resilient means for moving said plunger, and controlling means for said plunger, comprising a pair of relatively movable controlling elements cooperating to hold said plunger from movement under the action of said resilient means until a predetermined relative movement of said controlling elements has taken place and thereupon releasing said plunger for movement through a feeding stroke, and means for moving one of said controlling elements in unison with one of said first mentioned members in one direction.

28. In a device of the character described, relatively movable housing and base members, a reciprocable plunger and means to produce a feeding stroke of said plunger, and controlling means for said plunger, comprising a pair of relatively movable controlling elements cooperating to hold said plunger from movement under the action of said resilient means until a predetermined relative movement of said controlling elements has taken place and thereupon releasing said plunger for movement through a feeding stroke and a clutch device positively driving one of said controlling elements by movement of said housing and base members in a predetermined direction relative to each other.

29. The combination with a pair of relatively movable parts having engaging surfaces, of means for lubricating said surfaces comprising a pair of relatively movable members connected each with one of said movable parts to move therewith, a reciprocable feeding member and means for producing a feeding stroke of said feeding member after a predetermined amount of relative movement of said pair of parts, comprising a movable controlling element for said feeding member and means for driving said controlling element by means of one of said relatively movable members when the same moves in one direction, and holding said controlling element against movement with said movable member upon movement of the same in the opposite direction.

30. The combination with a pair of relatively movable parts having engaging surfaces, of means for lubricating said surfaces comprising a pair of relatively movable members mechanically connected each with one of said movable parts to move positively therewith, a reciprocable feeding member and means for controlling the feeding strokes of said reciprocable member, comprising a controlling element rotatable relative to one of said relatively movable members, a cooperating controlling element fixed relative to said last mentioned movable member, and means providing a mechanical driving connection between the other relatively movable member of said pair and said rotatable controlling element to rotate the same together in only one direction, and means for holding said rotatable controlling element against movement relative to its cooperating controlling element in a reverse direction.

31. The combination with a pair of relatively movable parts having engaging surfaces, of means for lubricating said surfaces comprising a pair of relatively movable members mechanically connected each with one of said movable parts to move positively therewith, a reciprocable feeding member and means for controlling the feeding strokes of said reciprocable member, comprising a cross-member carried by said feeding member and rotatable relative to one of said relatively movable members of said pair, a cooperating cam member fixed relative to said last mentioned movable member, and means for rotating said cross member always in the same direction relative to said cam member and providing a mechanical driving connection between the other of said pair of relatively movable members and said cross bar to rotate the same together in one direction, and means for holding said cross bar from rotation relative to said cam in a reverse direction.

32. In a device of the character described, a body portion having a bore therein, a reciprocable feeding member mounted in said body portion, a housing movably mounted on said body portion, means for controlling the feeding movements of said feeding member comprising a cam element and an element engaging said cam element, one of said elements being mounted in fixed position on said body portion, a clutch mechanism providing driving means for moving the other of said elements in unison with said housing in one direction and means for holding said last mentioned element from movement with said housing in the opposite direction.

33. In a device of the character described, a body portion having a bore therein, a feeding member mounted for reciprocation in said bore, a housing rotatably mounted on said body portion, controlling means for said feeding member comprising a cam fixed on said body portion, a cross member engaging said cam and connected with said housing through a driving clutch mechanism comprising means for moving said cross member in unison with said housing in one direction and fixing the same relative to said body portion during movement of said housing in the opposite direction relative to said body portion.

34. In a device of the character described, a body portion having a bore therein, a feeding member mounted for reciprocation in said bore, a housing rotatably mounted on said body portion, controlling means for said feeding member comprising a cam fixed on said body portion, a cross member engaging said cam and connected with said housing through a driving clutch mechanism comprising means for moving said cross member in unison with said housing in one direction and a frictional means for holding said cross member stationary relative to said body portion during movement of said housing in the opposite direction relative to said body portion.

35. In a device of the character described, a body portion having a bore therein, a feeding member mounted for reciprocation in said bore, a housing rotatably mounted on said body portion, controlling means for said feeding member comprising a cam fixed on said body portion, a cross member engaging said cam and connected with said housing through a driving clutch mechanism comprising means for moving said cross member in unison with said housing in one direction and fixing the same relative to said body portion during movement of said housing in the opposite direction relative to said body portion, said device having means provided thereon for connecting the same in a lubricant supply line.

36. In a device of the character described, a body portion having a bore therein, a feeding member mounted for reciprocation in said bore, a housing rotatably mounted on said body portion, controlling means for said feeding member comprising a cam fixed on said body portion, a cross member engaging said cam and connected with said housing through a driving clutch mechanism comprising means for moving said cross member in unison with said housing in one direction and holding the same fixed relative to said body portion during movement of said housing in the opposite direction relative to said body portion, said body portion having means for supplying lubricant to said bore.

37. In a device of the character described, a body portion having a bore therein, a feeding member mounted for reciprocation in said bore, a housing rotatably mounted on said body portion, controlling means for said feeding member comprising a cam fixed on said body portion, a cross member engaging said cam and connected with said housing through a driving clutch mechanism comprising means for moving said cross member in unison with said housing in one direction and fixing the same relative to said body portion during movement of said housing in the opposite direction relative to said body portion, said housing having means for supplying lubricant to the interior thereof.

38. In a device of the character described, a body portion having a bore therein, a feeding member mounted for reciprocation in said bore, a housing rotatably mounted on said body portion, controlling means for said feeding member comprising a cam fixed on said body portion, a cross member engaging said cam and connected with said housing through a driving clutch mechanism comprising means for moving said cross member in unison with said housing in one direction and holding the same stationary with said body portion during movement of said housing in the opposite direction relative to said body portion, said housing having means for supplying lubricant to the interior thereof, and said body portion having a passage therein communicating with the space in said housing and with said bore.

39. In a device of the character described, fluid feeding means comprising a member having a bore therein, a reciprocable member operating therein, resilient means for moving said reciprocable member in a feeding direction, means for moving said reciprocable member against the action of said resilient means and permitting said resilient means to actuate said reciprocable member by snap action, comprising a cam mechanism and a one-way driving clutch mechanism having means associated therewith cooperating said said cam mechanism, and a fluid tight housing for said reciprocable member, resilient means and cam and clutch mechanism, said housing being adapted to contain a lubricant, said cam mechanism being actuated by said housing in one direction through said clutch mechanism.

40. In a device of the character described, fluid feeding means comprising a member having a bore therein, and metering feeding mechanism comprising a feeding member reciprocable in the member having the bore therein, a housing portion, a rotatable controlling element, and means for moving said feeding member in proportion to the movement of said controlling element, comprising a clutch mechanism positively actuated by the relative movement of the housing portion and the member having the bore therein, in one direction, to move said controlling element with said housing portion in said direction, said clutch mechanism comprising means for holding said controlling element stationary with the member having the bore therein upon relative movement of said housing portion and said member having the bore therein, in a reverse direction, and resilient means for urging said feeding member in a feeding direction upon movement of said controlling element through a predetermined distance.

41. In a device of the character described, fluid feeding means comprising a member having a bore therein, and metering feeding mechanism comprising a feeding member reciprocable in the member having the bore therein, a housing portion, a rotatable controlling element, and means for moving said feeding member in proportion to the movement of said controlling element, comprising a clutch mechanism positively actuated by the relative movement of the housing portion and the member having the bore therein, in one direction, to move said controlling element relative to the member having the bore therein, in one direction, and said feeding member in one direction in proportion thereto, said clutch mechanism comprising means for holding said controlling element stationary with the member having the bore therein upon relative movement of said housing portion and said member having the bore therein, in a reverse direction, resilient means for urging said feeding member in the opposite direction and cam means cooperating with said controlling element to release said feeding member for movement by said resilient means in a feeding direction by snap action upon movement of said controlling element through a predetermined distance.

42. In a device of the character described, fluid feeding means comprising a member having a bore therein, a reciprocable feeding member operating in said bore, and means for reciprocating said member comprising a pair of cooperating clutch members, and a controlling element, one of said clutch members comprising means for holding said controlling element against movement relative to the member having the bore therein, in one direction, and the other of said clutch members having means for moving said controlling element with said last mentioned clutch member relative to the member having the bore therein, in the opposite direction.

43. In a device of the character described, fluid feeding means comprising a member having a bore therein, and metering feeding mechanism comprising a feeding member reciprocable in said bore, a housing portion movable relative to said member having the bore therein, and means controlling the movements of said feeding member in proportion to the relative movement of said housing portion and the member having said bore therein, in one direction, said means comprising a driving mechanism for moving said feeding member in one direction upon relative movement of the housing and member having the bore therein, in one direction, said driving mechanism including a controlling element, holding means for preventing movement of said controlling element in a reverse direction, said driving means moving said feeding member in a direction opposite to the feeding direction and resilient means for moving said feeding member in a feeding direction.

44. In a device of the character described, a member having a longitudinal bore, a shell mounted upon said member, a plunger operable in said bore, spring means for normally urging the plunger in a feeding direction, a controlling element, mechanism connecting the shell with the controlling element for imparting rotatory motion to the latter comprising a combined driving and holding clutch device, said member having the bore therein being provided with a cam surface and said controlling element being adapted to engage said cam surface to move said plunger against the action of said spring means to tension the same and periodically release the same to produce a snap movement of said plunger in a feeding direction by said spring means, said clutch device carrying said last controlling element with said shell in one direction of movement thereof by a positive driving connection and holding said controlling element against movement with said shell in the opposite direction.

CHARLES J. EACOCK.
CLAUDE H. CLAUSER.